April 3, 1934.  F. B. POWERS  1,953,129
SHUNTED INTERPOLE FOR RAILWAY MOTORS
Filed June 21, 1933   2 Sheets-Sheet 1
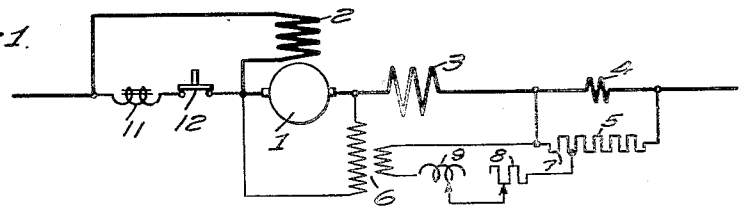
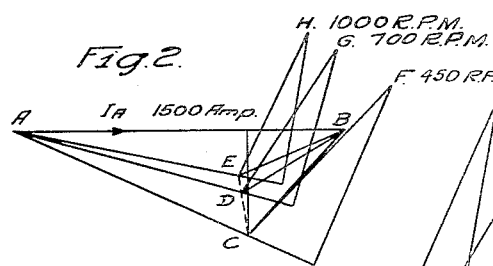
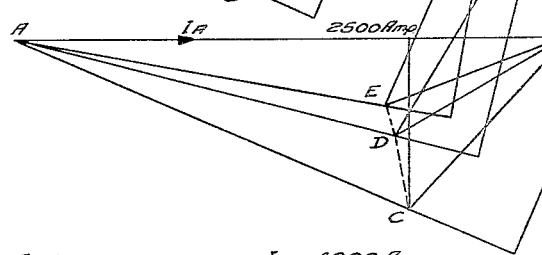
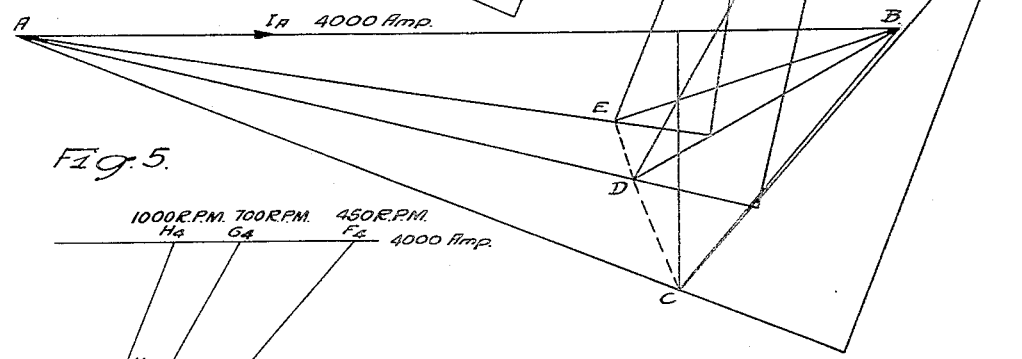
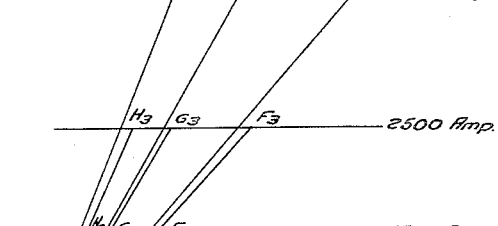
INVENTOR
Frank B. Powers.
BY O. B. Buchanan
ATTORNEY April 3, 1934.  F. B. POWERS  1,953,129
SHUNTED INTERPOLE FOR RAILWAY MOTORS
Filed June 21, 1933  2 Sheets-Sheet 2
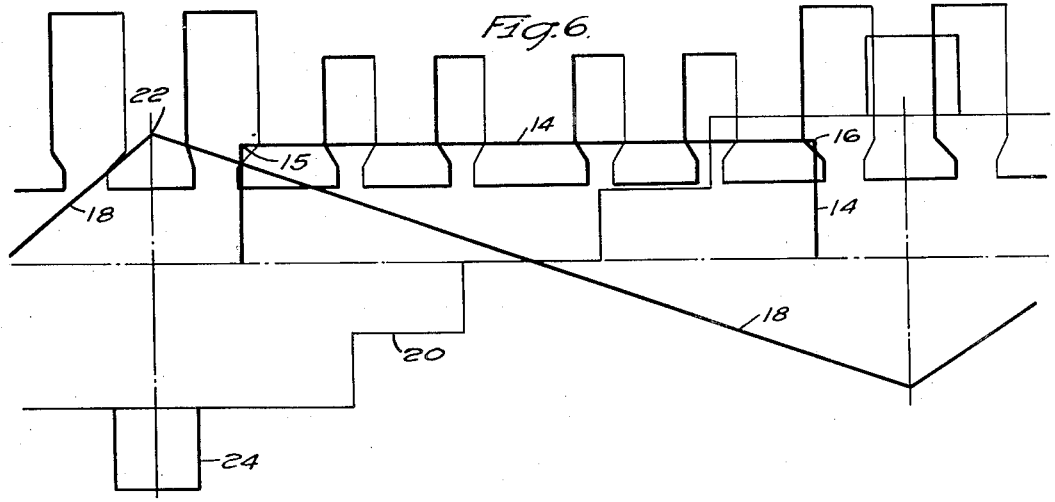
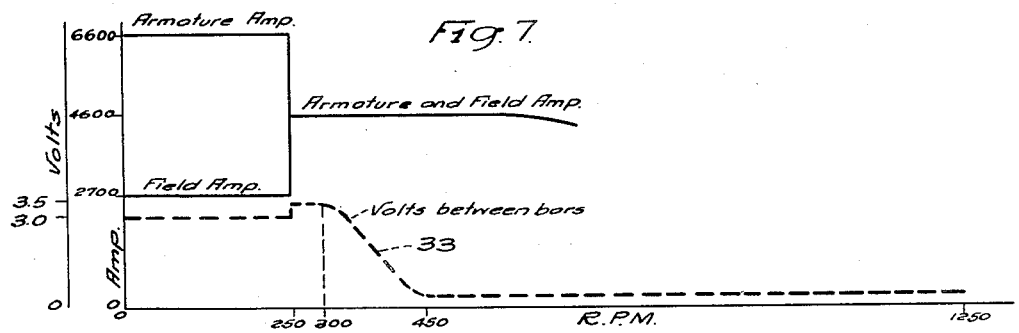
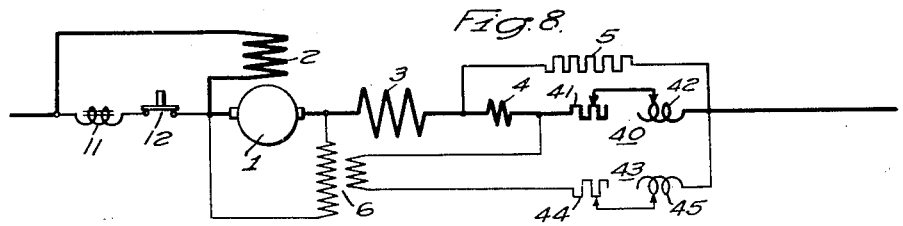
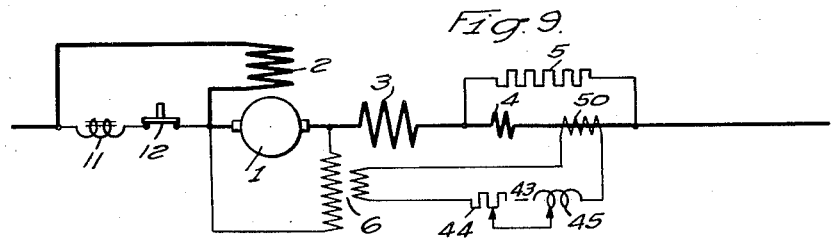
WITNESSES
E. A. McCloskey
Fred C. Wham
INVENTOR
Frank B. Powers.
BY O. B. Buchanan
ATTORNEY Patented Apr. 3, 1934

1,953,129

UNITED STATES PATENT OFFICE 1,953,129

SHUNTED INTERPOLE FOR RAILWAY MOTORS

Frank B. Powers, Wilkinsburg, Pa., assignor to Westinghouse Electric & Manufacturing Company, East Pittsburgh, Pa., a corporation of Pennsylvania Application June 21, 1933, Serial No. 676,849

18 Claims. (Cl. 172—274)

My present invention is an improvement over that which is shown and described in an application of Herbert G. Jungk, Serial No. 496,800, filed November 19, 1930, and assigned to the Westinghouse Electric & Manufacturing Company. My invention relates particularly to the shunted interpoles for series single-phase railway motors of the type described in said Jungk application, that is, of the type which is characterized by a large air-gap and a low flux-density.

The object of my invention is to provide an automatic control means for regulating the shunt across the interpole windings so as to provide perfect commutation at all speeds which are high enough to make the interpole winding fully effective, whereby certain results and advantages will be obtained, as will be subsequently more definitely explained in connection with the accompanying drawings wherein Figure 1 is a diagrammatic view of circuits and apparatus showing a motor equipped with my invention, Figs. 2, 3, 4 and 5 are vector diagrams which will be referred to in the explanation of the adjustment and operation of my invention, Fig. 6 is a diagrammatic view showing the various magnetomotive forces operative on the armature and field member of my motor, Fig. 7 is a speed curve which will be referred to in the explanation of the operation, and Figs. 8 and 9 are views, similar to Fig. 1, showing modifications.

As shown in Fig. 1, my invention is applied to a series alternating-current motor having a commutator-type armature 1, a field winding or main or exciting winding 2, an auxiliary or compensating winding 3, and an interpole or commutating winding 4. The interpole winding 4 is shunted by a shunt which, according to my invention, consists wholly of resistance 5, with as little inductance as practicable, for a reason which will be explained hereinafter. The division of current between the interpole-winding 4 and the interpole-shunt 5 is further controlled, in accordance with my invention, by means of an auxiliary transformer 6, the primary winding of which is energized across the terminals of the armature 1 and the secondary winding of which, in the embodiment of my invention shown in Fig. 1, is connected across a portion 7 of the resistor 5, through an impedance which may include a resistor 8 or an air-core inductor 9, or both, both of which may be initially adjusted to any desired calculated value, as will be subsequently explained, and either or both of which may be omitted entirely if the conditions warrant. It is contemplated that the impedance 8—9 shall not be altered after the initial adjustment thereof at the factory.

As stated above, my motor is of the type utilizing a large air-gap and a low field-flux-density, as described in the aforesaid Jungk application. As further set forth in said Jungk application, my motor is provided with means for still further reducing the field-flux-density at starting, said means comprising a main-field shunt comprising an iron-core reactor 11 which is cut out, after the train has attained a certain speed, by means of a contactor 12 which is controlled from the controller (not shown) or by other suitable means constituting no part of my present invention.

I have found that it is necessary, at least in the present state of knowledge of the art, to determine experimentally the various values of the interpole current and voltage, with respect to the armature current, which are necessary to give perfect commutation at different values of speed and armature current. Figs. 2, 3 and 4 are vector diagrams constructed from results obtained on the test floor, showing the proper relationships of interpole and shunted current at different values of armature current and speed. The values shown in these vector diagrams were obtained by operating the motor at each of three different values of armature current, and varying the speed of the phase and magnitude of the interpole current until points were obtained showing the proper values and locations of the vectors respecting the interpole current and voltage necessary to obtain the most perfect commutation, which was judged visually. The armature current $I_A$ is represented, in each case, by a horizontal line AB. The armature current $I_A$ is the resultant of the interpole current such as AC, AD, or AE, and the current in the interpole shunt, such as CB, DB, or EB, respectively, depending upon the speed of operation. The interpole voltage for 450 revolutions per minute is represented by the vector CF; for 700 revolutions per minute the interpole voltage is represented by the vector DG; and for 1,000 revolutions per minute the interpole voltage is represented by the vector EH. The locations of these points, C, D, E, F, G and H, are substantially the test values to give perfect commutation.

Fig. 2 represents the conditions obtainable with an armature current of 1500 amperes. Fig. 3 represents the conditions obtainable with an armature current of 2500 amperes. Fig. 4 represents the conditions obtainable with an armature current of 4,000 amperes.

After having obtained the interpole voltage vectors CF, DG, and EH, respectively, for different speeds, and for different armature currents, I plotted the same, as shown in Fig. 5, with respect to a common origin O and a common armature-current datum-line OI$_A$. The three interpole-voltages obtained in Fig. 2, are shown in Fig. 5 at OF$_2$, OG$_2$, and OH$_2$, and I find that the locus of the points F$_2$, G$_2$ and H$_2$ is substantially a straight line parallel with the armature current OI$_A$, for the particular motor tested. The three interpole-voltage vectors obtained in Fig. 3 are plotted in Fig. 5 as OF$_3$, OG$_3$ and OH$_3$, and the locus of the terminals of these three vectors also lies substantially in a straight line parallel with the armature current OI$_A$. The three interpole-voltage vectors obtained in Fig. 4 are plotted in Fig. 5 as OF$_4$, OG$_4$ and OH$_4$, and it is again found that the terminals of these vectors lie substantially in a straight line parallel with the armature current OI$_A$.

As a result of the experimental investigations and discoveries outlined above, I have devised a new control system for regulating the interpole shunt, taking advantage of the fact that the voltage increments F$_2$G$_2$, G$_2$H$_2$, etc., which have to be added to the interpole-voltages, at increasing speeds, are substantially in phase with the armature current. The essential features of my new control system is the utilization of some such means as an auxiliary transformer 6 connected across the armature 1, as shown in Figs. 1, 8 and 9.

The manner in which perfect or substantially perfect commutation is obtained by the means comprising my invention can be explained by considering the fact that in any alternating-current commutating machine, the voltage in the coils undergoing commutation is composed of two components, namely, a rotational or in-phase voltage component which is proportional to both speed and current and similar to that found in direct-current machines, and an additional, quadrature-related voltage component, at right angles to the rotational voltage component, said additional voltage component being induced in the armature coils undergoing commutation, by transformer action from the main field. This transformer voltage component is proportional only to the field or flux. The rotational or in-phase component of the sparking voltage is directly proportional to the slot-leakage flux caused by the current flowing in the armature conductors. For the higher values of armature current, however, the slot-leakage flux increases, and tends to saturate this leakage-flux path in the commutating zone in such a way that the in-phase voltage-component at a given speed departs from a straight-line relation to current similarly to other saturation curves such as the main-field-flux saturation curve.

It will thus be observed that both of these voltage components vary substantially with the flux, that is, they follow substantially the shape of the saturation curve of the machine, as the current is varied, so that the interdependence between the armature current and the commutation-voltage components of the coils undergoing commutation is the same as is obtained for the variation of flux with current in what is known as the saturation curve of the machine. It will be noted, however, that the voltage across the terminals of the armature is in like manner dependent upon, and inherently varies with, the current in accordance with the saturation curve of the machine and also the speed; in other words, it is a function of the product of the flux and the speed. Therefore, it may be seen that the armature voltage, when applied to counteract the voltage under the brushes, will be of the proper magnitude, at any current, according to the saturation curve of the machine, to counteract the volts generated or induced across the commutator bars.

The control system which I have designed, for regulating the interpole currents, is particularly applicable in machines having a low-flux-density and a large air-gap or, in general, in machines having what is known in the art as a critical design. This may be explained by referring first, to Fig. 6 which shows the distribution of the various field and armature magnetomotive forces in two poles of the machine. The heavy line 14 represents the ampere-turns, at the air gap, produced by the main field winding 2 of Fig. 1. This reaches a maximum value just inside the edge of the main pole, as indicated by the numeral 15, and retains this value until the corresponding point 16 is reached, on the other side of the pole. As shown in Fig. 6 the main field is zero under the center of the interpoles, and reverses on the main poles on either side of the one shown in the center of the figure.

The armature reaction of the machine is represented in Fig. 6 by the heavy line 18. This reaches a maximum under the center of the interpole, becomes zero under the center of a main pole, and reaches a maximum in the opposite direction under the next interpole. Owing to the large number of armature slots, the armature-reaction curve 18 is shown as a smooth straight-line curve. In reality, it consists of a large number of vertical increments corresponding to the position of the armature slots at any moment, but the increments are so numerous and so small that the fringing action of the flux practically masks the presence of these vertical increments, so that no substantial error is introduced by showing the curve 18 as composed of continuous, straight diagonal lines.

The auxiliary or compensating winding 3 (Fig. 1) is put on the machine in order to counteract this armature reaction as much as possible. Its magneto-motive force is shown by the light line 20 in Fig. 6. On account of the space required by the main field winding and by the interpole winding, and on account of the smaller number of slots on the stator than on the rotor, it is impossible, from a design standpoint, to cause the compensating ampere-turns 20 to exactly compensate for the armature ampere-turns 18 at every point across the pole face. For this reason, at various points across the pole face, a difference in ampere-turns exists between the armature reaction 18 and the compensating winding ampere-turns 20. This difference is ampere-turns immediately becomes effective either against or with the main field-flux 14, depending upon the direction of the difference.

The condition just described leads to what is known in the art as a critical or sensitive device. In other words, the more ampere-turns operating against or for the main field, across the pole face, the more sensitive the machine becomes to changes in the neutral point and to temperature changes. Since the apex of the armature-reaction curve 18 is at the neutral point of the machine, or substantially under the center of the effective current-carrying area of the brush, as indicated at 22 in Fig. 6, any change in this neutral point results in a bodily shifting of the entire armature-reaction curve, either to the right or to the left, in Fig. 6, and this shifting, even though it be very slight, necessarily results in a difference in ampere-turns, or a certain number of uncompensated ampere-turns, which either add to, or subtract from, the main field-flux.

Temperature changes produce certain changes in the commutating zone of the machine, mainly in the ampere-turns produced by the interpole-winding 4 (Fig. 1), as represented in Fig. 6 by the hump 24 in the compensating ampere-turn curve 20. This is because the temperature changes in the machine change the resistance of the interpole-winding and thus change the distribution of current between the interpole-winding 4 and its shunt 5, because it is impossible to design the shunt 5 so as to have a temperature which approaches at all closely to the temperature of the machine windings at all times. Consequently, the shunt 5 is made of a material which has a substantially zero temperature-coefficient, so that this shunt may be worked very hard, with forced ventilation, to conserve the weight and space occupied by the same, and without any effort at the apparently impossible task of attempting to make its resistance vary in accordance with the variations of the resistance of the interpole winding 4, with changes in temperature. The result is that the perfection of commutation is affected by the temperature of the machine, and this, in turn, affects the neutral point because of the charring of the trailing brush-tips, due to poor commutation, which shifts the effective center of the brushes and thus shifts the neutral of the machine.

The difference between my machine and a design which is known in the art as a very stable machine will be perceived by comparing the same with a direct-current commutator machine, in which it is normal practice to put about four times as many ampere-turns on the main field as exist on the armature. Such a machine is very "stable" because any resultant ampere-turns remaining uncompensated on the armature are a very small percentage of the total main field turns. Such a machine necessarily has a high flux density, that is, a large number of lines of force in the air-gap, per pole.

However, on alternating-current machines, it is impossible to utilize as much as a four-to-one ratio of ampere-turns in favor of the main field, because an exciting flux of above 3.2 megalines per pole will induce, by transformer action in the coils undergoing commutation, a voltage component of such magnitude that glowing takes place at the surface of the brush. The transformer voltage induced in the coils undergoing commutation bears a direct relation to the ratio of field ampere turns to armature ampere turns because, since torque is a product of field flux and armature ampere turns, then to keep a low transformer voltage the field flux will be low and also the field turns will be low, while the armature ampere turns must be increased accordingly. Hence the ratio of field turns to ampere turns must be low.

As a result of considerations such as have just been outlined, the low-flux design came into use, as described in the aforementioned Jungk application. It is seen, therefore, that any uncompensated ampere-turns, appearing at the air-gap as a difference between armature-reaction and compensating-winding ampere-turns, are a large proportion of the total ampere-turns on the main field. This leads to what is known as a critical design.

The air-gap of the machine is determined in much the same manner. A long air-gap requires many ampere-turns to force the flux across it. Therefore, the longer the gap permitted, the smaller will be the effect of the uncompensated ampere-turns on the main field ampere-turns. On the other hand, a long air-gap affects the interpole-flux in the opposite manner, making it necessary to increase the number of ampere-turns on the interpole-winding, in order to force a sufficient interpole-flux across the same air-gap. The number of ampere-turns which may be put into the interpole-windings is usually fixed, because of space limitations, so that, the longer the air-gap, the weaker will be the interpole-flux, which means that a higher speed of rotation will have to be reached before the rotational voltages induced in the commutation coils by the interpole-flux will be sufficient to compensate for the commutating voltages and produce perfect commutating conditions in the coils undergoing commutation. It is generally desirable to make this speed of best commutation, at which the interpole flux first becomes effective to fully compensate for the commutating voltages of the coils undergoing commutation, as low as possible, by the use of a larger-air-gap machine, which has its large air-gap for the purpose of minimizing the harmful effects of uncompensated armature-reaction. This will necessarily entail a high speed of operation, which has been made possible by improvements in the commutator design, as pointed out in the aforementioned Jungk application. The large-air-gap design has previously been avoided, by electrical designers in the art, also because it entails a somewhat lower power-factor for the motor.

A long air-gap also requires, for its successful utilization, a very perfect compensation of the armature-reaction, so that the leakage flux of the machine is kept to a minimum, because this leakage flux appears in the terminal volts of the machine and also results in a low power factor. In order to increase the air-gap of a series single-phase motor, it was necessary to change the space factors of the stator field poles, which determine the leakage, so that the leakage would not increase, as the air-gap increased. To prevent excessive leakage, it was necessary to increase the space between the pole-tips, thus taking up valuable space and tending to reduce the output obtainable in a machine occupying a given space. However, the speed of rotation had to be increased, at the same time, in order to obtain good commutation with the weaker interpole fluxes which were obtainable with the longer air-gaps, and it was found that the loss in power resulting from the lost space which was necessary to avoid excessive leakage was more than compensated for by the increase in speed, because the output of a given machine is directly proportional to its speed. The speed is, in general, limited by the commutator design, and these commutator speeds are being steadily increased, as design and service experience permits.

My invention is particularly applicable in machines having a maximum flux of the order of 3 megalines per pole, and having an air-gap of approximately .125 inch, when designed for 25-cycle operation. The maximum flux-density is probably approximately 3.2 megalines per pole, at 25 cycles, or approximately 80/f megalines per pole, where f is the applied frequency in cycles per second. The minimum air-gap is now probably approximately .12 inch, but future designs will probably utilize air-gaps within the range of .14 to .18 inch, or even higher.

The latest design of machines has had a definite trend toward a constant value of torque per pole. Therefor, machines which must produce large starting torques require a large number of poles. In order to obtain good commutating characteristics, these poles must be connected in parallel. The armature current, however, is the resultant of the currents in all of the main-field pole-windings which are connected in parallel. Consequently, very high line currents are required, at relatively low voltages, the same being usually supplied by means of a step-down transformer on the locomotive (not shown).

Some conception of the order of magnitudes involved will be had by reference to Fig. 7, which is a somewhat idealized curve diagram showing the conditions obtainable at different speeds in each motor of the present Pennsylvania Railroad locomotive motors, which operate on a 25 cycle supply circuit. The machine is started with the main field-winding 2 (Fig. 1) shunted by the iron-core inductor 11, so that a maximum field current of 2700 amperes, giving a flux of 2.7 megalines, is obtained when the maximum starting current of 6600 armature amperes is required to start the train. At a train speed corresponding to an armature speed of approximately 250 revolutions per minute, the locomotive engineer changes his controller so as to disconnect the main-field shunt 11, or automatic control may function to do this, so that the main-field current becomes equal to the armature current, and this current from then on has a value which does not exceed 4600 amperes, as shown in Fig. 7. At the same time, the field flux increases from 2.7 to 3.2 megalines per pole, the increase following the saturation curve of the machine.

The commutating conditions obtainable at different speeds are also indicated, by the dotted line 33, in Fig. 7. At standstill, the interpole-winding cannot produce any electromotive force of rotation, no matter how strong it is, so that the voltage between bars, under the brushes, is the voltage induced in the coil undergoing commutation, by transformer action from the main field, and this is 3.0 volts between bars at the maximum starting field-strength of 2.7 megalines. When the changeover is made, at approximately 250 R. P. M., from shunted-field operation to full-field operation, the voltage between bars increases to 3.5, but the commutation is improved because of the reduction in the armature current which has to be commutated.

As the speed thereafter increases, above 250 R. P. M., certain changes are produced in the commutation. As above pointed out, it is impossible, no matter how much interpole-flux is utilized, to secure any benefit from the interpole-windings at zero speed. It is a simple matter of economy to determine at what point, in the speed curve, the electromotive force generated in the coils undergoing commutation by the interpole-flux will begin to make itself felt, as it is obviously uneconomical to make the interpole flux anything like an approach to an infinite number of lines of force which would be necessary at very low speeds. In the design in question, the interpole flux begins to make itself felt at 300 R. P. M. and thereafter reduces the volts between bars, along some such curve as that indicated by the dotted line 33, until the commutating voltage of the coils undergoing commutation is exactly neutralized at 450 R. P. M., resulting in substantially zero volts between bars at this point, or less than 1 volt or possibly 2 volts, depending upon the desired commutator and brush life, with any definite type of brush. From this point on, up to the maximum speed of the motor, which is 1250 R. P. M., the voltage between bars, under the brushes, remains substantially zero.

In the design shown in the afore-mentioned Jungk application, the interpole winding was shunted by a shunt which was composed of reactance and resistance, without the use of my auxiliary transformer 6 which is energized across the armature terminals. The total impedance of this interpole shunt was something of the order of .015 ohms, and this shunt gave only one operating speed at which minimum volts per bars were obtained. In later designs, as suggested in the Jungk application, other points of perfect commutation were obtained by shunting out portions of this .015 ohm shunt, in two different steps, by short-circuiting one or both of two groups of about .006 ohms, by means of contactors, thereby obtaining three speeds of perfect commutation. Furthermore, as has been pointed out above, the design is very critical. The motor is very sensitive to even slight changes in the shunt impedance, so that, if a shunt of .015 ohms is required, a shunt of .016 ohms will produce much less satisfactory commutation at the same speed. The difficulty of this old design, utilizing contactors for shunting out portions of the interpole shunt, will be appreciated when it is realized that the switch-contacts of the contactors will normally have an impedance of something like .0005 ohms, but this impedance is widely variable, depending upon the condition of the switch-contacts, varying, in practice, over a range as wide as from .000005 ohms to .001 ohms. The uncertain effects of such switch-contacts, shunting an impedance of .006 ohms, is readily apparent.

An important advantage of my new interpole shunt system is, therefore, the fact that no switches or their attendant control are necessary to adjust the interpole-shunt for various machine speeds. As noted above, the switch-contacts which were previously necessary caused variations in the effective resistances of the interpole shunts, thereby introducing operational difficulties which are entirely eliminated in my circuit. Furthermore, variation in switch-contacts, in the former design, required a test floor and experienced men to make adjustments from time to time, thereby adding considerable expense in addition to taking the motors out of service.

The elimination of the switch contact-drop, which is accomplished in the automatic or inherently operating interpole shunt of my invention, is more particularly adapted for the larger sizes of motors, or for motors having the smaller flux densities, or, in general, for motors requiring the highest currents so that the contact-drops of any switches and joints become of considerable value in the total voltage. Heretofore, series commutator motors of the type in question, utilizing switch-contacts for controlling the interpole-shunts, have become more and more critical as the sizes of the design have increased, until the designers have reached about a limit, insofar as sensitivity and critical values in the machines are concerned. My new automatic interpole-shunt control means gets rid of critical values in the interpole-shunt circuit of the machines, and allows even further extensions in the design, in the direction of more poles, higher torque, and less flux, all of which means a motor having higher armature-current.

My invention is particularly applicable to motors which are mounted in locomotives where space must be provided for the proper inspection and maintenance of the switches and other moving parts on the interpole-shunts when such parts are used. When my automatic or inherently operating shunt is applied, there are no moving parts and no adjustments are necessary, and consequently the space formerly required may be utilized for other purposes.

It is possible to design and run series single-phase motors with the voltage between bars not entirely compensated. In such cases, this voltage may be taken care of by the contact-drop of the brush on the commutator, which may be relied upon up to about two volts between bars. In the former designs of motors, utilizing either a single interpole-shunt circuit or three interpole-shunt settings, giving zero voltage between bars only at one speed for each shunt-setting, fair commutation was achieved only as a result of the fact that the contact-drop of the brush will take care of the uncompensated voltage which remains at speeds other than the best speed, where said uncompensation voltage does not exceed approximately two volts. With my automatic interpole-shunt circuit herein described, the interpole is adjusted automatically for all speeds, and the operation of the motor, in the speed-range in which the interpole is effective, does not depend to any extent upon the contact-drop of the brush handling the uncompensated voltage, because there is substantially no uncompensated voltage to be handled.

The essential feature of my invention is that the armature terminal voltage, or, in general, a voltage which varies inherently with both the speed and the current, is applied to the interpole through a transformer of suitable ratio to bring the voltage-magnitude down to that which is desired in order to produce the voltage increments $F_2G_2$, $G_2H_2$, etc., as shown in Fig. 5 and as determined experimentally for the particular motor in question. The means of application of this voltage to the interpole is not important. In the Pennsylvania locomotive motor which I have tested, I prefer to utilize the circuit shown in Fig. 1, with the series impedance 8—9 cut out altogether, or adjusted to zero value. Such circuit requires only the armature voltage transformer 6 as additional equipment in addition to the interpole-shunt 5.

As shown in Fig. 8, however, the secondary voltage of the armature voltage transformer 6 may be applied across an impedance 40 which is in series with the interpole-winding 4, the interpole-shunt 5 being connected around both the interpole-winding 4 and the series impedance 40. The series impedance 40 may comprise a resistance 41 and an inductance 42, either one or both of which may be initially adjusted at the factory, to any necessary value. In addition, the phase and magnitude of the applied voltage may be further controlled by utilizing an impedance 43 in series with the secondary of the transformer 6, and this series impedance 43 may consist either of an initially adjusted resistance 44 or an initially adjusted inductance 45, or both, the same being initially adjusted at the factory and thereafter left unchanged.

Another variation in the method of applying the armature voltage to the interpole winding is shown in Fig. 9, in which the voltage from the secondary of the auxiliary transformer 6 is applied across a series transformer 50 in series with the interpole-winding 4. In this case, the interpole-shunt 5 is shunted both around the interpole-winding 4 and the series transformer 50. Here, again, the phase and/or magnitude of the corrective effects introduced by the auxiliary voltage may be adjusted by an impedance 43 as described in connection with Fig. 8.

All of the reactors which have been mentioned in connection with the interpole-shunt circuits, that is, the reactor 9 of Fig. 1 or the reactors 42 or 45 of Fig. 8, are of an air-core type in order to minimize changes in resistance and reactance for different values of current.

In connection with my present invention, I have noticed that alternating-current commutator machines which are equipped with shunted interpoles have much better commutation when the interpole-shunt is a pure resistance than when reactance is utilized in the interpole-shunt, as was necessary in previous designs in which the armature voltage was not applied to control the current in the interpole-winding. I have concluded that one reason for this is that the pure resistance-shunt offers a low-impedance path for any high-frequency currents which may circulate through the machine, thereby keeping these high-frequency currents out of the interpole-winding. Such high-frequency currents are induced in the armature because of the rotation of the slots and combinations of slots passing under the poles. In all of the embodiments of my invention, therefore, as shown in Figs. 1, 8 and 9, a pure-resistance path 5 is connected around the interpole in each case, thereby allowing the high-frequency currents to pass around the interpole and giving better commutation for any speed, particularly in the connection shown in Fig. 1, in which the armature voltage is applied only to the interpole-shunt, as distinguished from being applied to the interpole-winding itself.

In the present designs, the extremely high line-currents and low line-voltages necessitated by low-flux and high-speed design make the problem of temperature change, contact-drop change, and shunt-reactance change of a critical nature. My circuit comprising the automatic transformer 6 takes out all variation introduced by the above-mentioned variables because, fundamentally, once the circuit is adjusted, it requires no change in any of its characteristics.

I claim as my invention:

1. A series single-phase dynamo-electric machine comprising at least the following elements in combination, a commutator-type armature, a series field-winding, a series compensating-winding, a series interpole-winding, a fixed interpole-shunt having constant, unchanged circuit-connections throughout the entire range of operation of said machine, means for deriving a voltage which varies inherently with both the speed and the current in said machine, and means for so applying said voltage as to effect the division of current between said interpole-winding and said interpole-shunt at different speeds and currents.

2. A series single-phase dynamo-electric machine comprising at least the following elements in combination, a commutator-type armature, a series field-winding, a series compensating-winding, a series interpole-winding, an interpole-shunt, an auxiliary voltage-transforming means energized across the armature so as to derive a voltage which varies inherently with both the speed and the current in said machine, and means for so applying said voltage as to affect the division of current between said interpole-winding and said interpole-shunt at different speeds and currents.

3. A series single-phase dynamo-electric machine comprising at least the following elements in combination, a commutator-type armature, a series field-winding, a series compensating-winding, an interpole-winding, means for deriving a voltage which varies inherently with both the speed and the current in said machine, and means for so applying said voltage as to effect a control over the excitation of said interpole-winding.

4. A series single-phase dynamo-electric machine comprising at least the following elements in combination, a commutator-type armature, a series field-winding, a series compensating-winding, an interpole-winding, an auxiliary voltage-transforming means energized across the armature so as to derive a voltage which varies inherently with both the speed and the current in said machine, and means for so applying said voltage as to effect a control over the excitation of said interpole-winding.

5. A low-flux, large-air-gap, single-phase, commutator motor, by "low-flux" meaning less than approximately $80/f$ megalines per pole, where $f$ is the applied frequency in cycles per second, and by "large-air-gap" meaning greater than .12 inch, said motor having a compensating winding and main and interpole field windings, an interpole-shunt for the latter, comprising substantially pure resistance, and auxiliary-voltage means for causing the sparking voltage between commutator-bars, for the coils undergoing commutation, to be substantially zero both as to the in-phase components and the quadrature-related transformer-action components, at all speeds at and above the speed at which the interpole windings first become fully effective to overcome the sparking voltage in the coils undergoing commutation.

6. A low-flux, large-air-gap, single-phase, commutator motor, by "low-flux" meaning less than approximately $80/f$ megalines per pole, where $f$ is the applied frequency in cycles per second, and by "large-air-gap" meaning greater than .12 inch, said motor having a compensating winding and main and interpole field windings, an interpole-shunt for the latter, comprising substantially pure resistance, and an auxiliary voltage-transforming means energized across the armature and so applied as to cause the sparking voltage between commutator-bars, for the coils undergoing commutation, to be substantially zero both as to the in-phase components and the quadrature-related transformer-action components, at all speeds at and above the speed at which the interpole windings first become fully effective to overcome the sparking voltage in the coils undergoing commutation.

7. The invention as defined in claim 1, characterized by said auxiliary voltage being applied across a portion of said interpole-shunt.

8. The invention as defined in claim 1, characterized by said auxiliary voltage being applied across a portion of said interpole-shunt, and means for adjusting the phase and/or magnitude of the corrective effects introduced by said auxiliary voltage.

9. The invention as defined in claim 1, characterized by a series impedance device in series with the interpole-winding, said interpole-shunt being shunted around both the interpole-winding and the series impedance device, said auxiliary voltage being applied across the series impedance device.

10. The invention as defined in claim 1 characterized by a series impedance device in series with the interpole-winding, said interpole-shunt being shunted around both the interpole-winding and the series impedance device, said auxiliary voltage being applied across the series impedance device, and means for adjusting the phase and/or magnitude of the corrective effects introduced by said auxiliary voltage.

11. The invention as defined in claim 1, characterized by a series transformer in series with the interpole-winding, said interpole-shunt being shunted around both the interpole-winding and the series transformer, said auxiliary voltage being applied across the series transformer.

12. The invention as defined in claim 1, characterized by a series transformer in series with the interpole-winding, said interpole-shunt being shunted around both the interpole-winding and the series transformer, said auxiliary voltage being applied across the series transformer, and means for adjusting the phase and/or magnitude of the corrective effects introduced by said auxiliary voltage.

13. The invention as defined in claim 5, characterized by said auxiliary voltage being applied across a portion of said interpole-shunt.

14. The invention as defined in claim 5, characterized by said auxiliary voltage being applied across a portion of said interpole-shunt, and means for adjusting the phase and/or magnitude of the corrective effects introduced by said auxiliary voltage.

15. The invention as defined in claim 5, characterized by a series impedance device in series with the interpole-winding, said interpole-shunt being shunted around both the interpole-winding and the series impedance device, said auxiliary voltage being applied across the series impedance device.

16. The invention as defined in claim 5, characterized by a series impedance device in series with the interpole-winding, said interpole-shunt being shunted around both the interpole-winding and the series impedance device, said auxiliary voltage being applied across the series impedance device, and means for adjusting the phase and/or magnitude of the corrective effects introduced by said auxiliary voltage.

17. The invention as defined in claim 5, characterized by a series transformer in series with the interpole-winding, said interpole-shunt being shunted around both the interpole-winding and the series transformer, said auxiliary voltage being applied across the series transformer.

18. The invention as defined in claim 5, characterized by a series transformer in series with the interpole-winding, said interpole-shunt being shunted around both the interpole-winding and the series transformer, said auxiliary voltage being applied across the series transformer, and means for adjusting the phase and/or magnitude of the corrective effects introduced by said auxiliary voltage.

FRANK B. POWERS.